(12) United States Patent
Townsend (10) Patent No.: US 8,567,691 B2
(45) Date of Patent: *Oct. 29, 2013

(54) SPRINKLER WITH VISCOUS HESITATOR AND RELATED METHOD

(75) Inventor: Michael Townsend, Waitsburg, WA (US)

(73) Assignee: Nelson Irrigation Corporation, Walla Walla, WA (US)

(*) Notice: Subject to any disclaimer, the term of this patent is extended or adjusted under 35 U.S.C. 154(b) by 461 days.

This patent is subject to a terminal disclaimer.

(21) Appl. No.: 12/149,265

(22) Filed: Apr. 29, 2008

(65) Prior Publication Data

US 2008/0277489 A1  Nov. 13, 2008

Related U.S. Application Data

(63) Continuation-in-part of application No. 11/409,069, filed on Apr. 24, 2006, now Pat. No. 7,584,904.

(51) Int. Cl.
B05B 17/04 (2006.01)

(52) U.S. Cl.
USPC ............................ 239/7; 239/222.17; 239/252

(58) Field of Classification Search
USPC ............ 239/222.11–224, 231–233, 252, 253, 239/256
See application file for complete search history.

(56) References Cited

U.S. PATENT DOCUMENTS

| | | | |
|---|---|---|---|
| 3,727,842 A | 4/1973 | Estsgaard et al. | |
| 4,375,513 A | 3/1983 | Debono et al. | |
| 4,796,811 A * | 1/1989 | Davisson | 239/222.17 |
| 4,836,449 A | 6/1989 | Hunter | |
| 4,836,450 A | 6/1989 | Hunter | |
| 5,192,024 A | 3/1993 | Blee | |
| 5,372,307 A | 12/1994 | Sesser | |
| 5,671,886 A | 9/1997 | Sesser | |
| 6,499,672 B1 * | 12/2002 | Sesser | 239/222.11 |
| 6,688,539 B2 * | 2/2004 | Vander Griend | 239/222.11 |
| 6,883,727 B2 * | 4/2005 | De Los Santos | 239/240 |

OTHER PUBLICATIONS

U.S. Appl. No. 12/149,264, filed Apr. 2008, Townsend.

* cited by examiner

Primary Examiner — Christopher Kim
(74) Attorney, Agent, or Firm — Nixon & Vanderhye, P.C.

(57) ABSTRACT

A method of controlling rotation of a water distribution plate supported on a shaft and adapted to rotate about an axis defined by the shaft by reason of impingement of a stream emitted from a nozzle on grooves formed in the plate, the method includes: (a) slowing the rotation of the water distribution plate intermittently so as to create intervals of relatively slow and relatively fast rotation and thereby correspondingly increase and decrease, respectively, a radius of throw of the stream or improve the uniformity of water distribution; and (b) continually changing circumferential locations of the intervals about the axis.

8 Claims, 13 Drawing Sheets

Fig. 18

SPRINKLER WITH VISCOUS HESITATOR AND RELATED METHOD

This application is a continuation-in-part of patent application Ser. No. 11/409,069, filed Apr. 24, 2006 now U.S. Pat. No. 7,584,904, the entire content of which is hereby incorporated by reference in this application.

BACKGROUND OF THE INVENTION

This invention relates to rotary sprinklers and, more specifically, to a rotary sprinkler having a stream interrupter or "hesitater" that operates in either a random or controlled manner to achieve greater uniformity in the sprinkling pattern and/or to create unique and otherwise difficult-to-achieve pattern shapes.

Stream interrupters or stream diffusers per se are utilized for a variety of reasons, and representative examples may be found in U.S. Pat. Nos. 5,192,024; 4,836,450; 4,836,449; 4,375,513; and 3,727,842.

One reason for providing stream interrupters or diffusers is to enhance the uniformity of the sprinkling pattern. When irrigating large areas, the various sprinklers are spaced as far apart as possible in order to minimize system costs. To achieve an even distribution of water at wide sprinkler spacings requires sprinklers that simultaneously throw the water a long distance and produce a pattern that "stacks up" evenly when overlapped with adjacent sprinkler patterns. These requirements are achieved to some degree with a single concentrated stream of water emitted at a relatively high trajectory angle (approximately 24° from horizontal), but streams of this type produce a nonuniform "donut pattern". Interrupting a single concentrated stream, by fanning some of it vertically downward, produces a more even pattern but also reduces the radius of throw.

Proposed solutions to the above problem may be found in commonly owned U.S. Pat. Nos. 5,372,307 and 5,671,886. The solutions disclosed in these patents involve intermittently interrupting the stream as it leaves a water distribution plate so that at times, the stream is undisturbed for maximum radius of throw, while at other times, it is fanned to even out the pattern but at a reduced radius of throw. In both of the above-identified commonly owned patents, the rotational speed of the water distribution plate is slowed by a viscous fluid brake to achieve both maximum throw and maximum stream integrity.

There remains a need, however, for an even more efficient stream interrupter or diffuser configuration to achieve more uniform regular or custom wetted pattern areas.

BRIEF SUMMARY OF THE INVENTION

One exemplary sprinkler incorporates a hesitating mechanism (or simply "hesitator" assembly) into a rotary sprinkler that causes a momentary reduction in speed of the water distribution plate. This momentary dwell, or slow-speed interval, alters the radius of throw of the sprinkler. In one exemplary embodiment, the hesitation or slow-speed interval occurs randomly, thus increasing the overall uniformity of the wetted pattern area. In this embodiment, a cam is fixed to the water distribution plate shaft, the cam (referred to herein as the "shaft cam") located in a sealed chamber containing a viscous fluid. Surrounding the shaft cam is a rotor ring that "floats" within the chamber and that is formed with ring lobes (sometimes referred to herein as "the hesitator lobes") adapted to be engaged by the shaft cam, and more specifically, a shaft lobe on the shaft cam. In this regard, the rotor ring is free not only to rotate but also to move laterally or translate within the chamber. Thus, when a ring or hesitator lobe is struck by the shaft lobe, the rotation of the shaft and water distribution plate slows until the shaft lobe pushes the ring or hesitator lobe out of its path, moving the rotor ring laterally but also causing some degree of rotation. By moving the rotor ring laterally, a second hesitater lobe is pulled into the path of the shaft lobe, such that a second slow-speed interval is set up. It will be appreciated that, due to the slight rotation of the rotor ring, the slow-speed hesitation events or intervals are incurred in a random or nonuniform manner, thus enhancing the uniformity or the "filling-in" of the circular wetted pattern area.

In a variation of this embodiment, the shaft to which the water distribution plate is mounted, is formed with (or fitted with) a cam disk having a plurality of circumferentially spaced cam disk lobes. Surrounding the shaft and cam disk within a sealed viscous fluid-containing chamber in the sprinkler housing, there is a free-floating (laterally moveable), rotatable stop disk formed with a pair of diametrically opposed stop disk lobes projecting radially inwardly, and a pair of circumferentially aligned stop disk tabs projecting radially outwardly that are adapted to slide within a pair of diametrically opposed recesses or slots in a random position rotor ring which is freely rotatable within the viscous chamber.

The cam disk lobes are arranged so as to "interfere" with the stop disk. More specifically, when a rotational force is applied to the shaft (by reason of the nozzle stream impinging on the rotatable water distribution plate), the shaft and the cam disk will rotate within the chamber such that a lobe on the cam disk will come into contact with a stop disk lobe, causing the interference, and significantly slowing the shaft and water distribution plate speed. With the rotational force continually being applied, the cam disk lobe will push the stop disk laterally until it can pass by the stop disk lobe. As this is taking place, a diametrically opposed lobe on the stop disk will be pulled inwardly, positioning it to interfere with the next approaching lobe on the cam disk.

Figure 13:
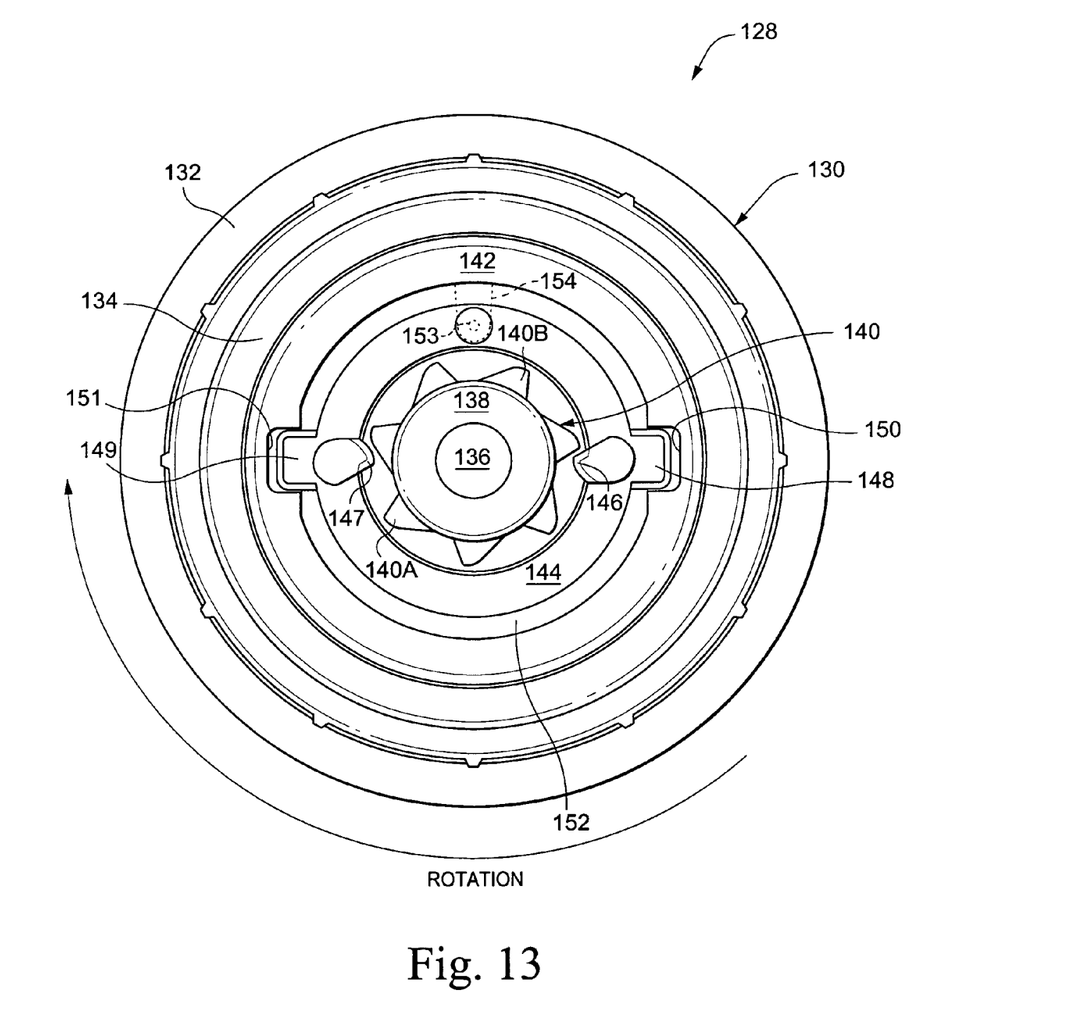
FIG. 13 is a section view similar to those shown in FIGS. 9-11, but illustrating still another exemplary embodiment of the hesitator device.

Lateral movement at the stop disk (to the left as shown in FIG. 13) causes the tabs on the stop disk to slide within the slots or recesses in the rotor ring, i.e., the slots or recesses confine the action of the stop disk to a back and forth action only. As a lobe on the cam disk is pushing on a tab on the stop disk, however, some of the rotational force is transferred into the random position rotor ring, causing it (and the stop disk) to rotate within the housing, thus assuring that the next interference site is circumferentially offset from the previous interference site.

In another exemplary embodiment, the rotor ring as described in connection with the first embodiment, is split into a pair of arcuate segments that are confined to pivoting motion, i.e., the segments are not free to randomly rotate, such that the hesitation or slow-speed intervals are controlled and predictable. Thus, non-round patterns can be designed for wetting irregular areas. For example, if each arcuate segment is provided with a pair of hesitator lobes, one on either side of the segment pivot pin, four relatively short slow-speed intervals are established, separated by four relatively long fast-speed intervals, thus creating a four-legged sprinkling pattern.

In still another embodiment, a 360° rotor ring having a pair of diametrically opposed hesitator lobes is confined in the chamber for lateral movement or translation as the shaft lobe pushes past the hesitater lobes. With this arrangement, a pair of relatively short diametrically opposed slow-speed intervals are separated by a pair of relatively long fast-speed intervals, creating a linear sprinkling pattern.

Accordingly, in one aspect, the invention relates to a sprinkler device comprising: a shaft having a cam, the cam having at least a pair of radially outwardly projecting cam lobes; a rotatable water distribution plate adapted to be impinged upon by a stream emitted from a nozzle causing at least the water distribution plate to rotate; a hesitator assembly including a stationary housing having a sealed chamber at least partially filled with a viscous fluid, with at least the cam and the cam lobes located within the chamber; a stop disk located within the chamber in substantially surrounding relationship to the cam, the stop disk loosely located within the chamber for rotation and translation; a rotatable random position rotor ring surrounding the stop disk within the chamber; wherein the stop disk is formed with two or more disk lobes movable laterally into and out of a path of rotation of the cam lobes; and wherein one of the stop disks and the rotor ring is formed with plural tabs and the other of the stop disks and the rotor ring is formed with plural corresponding recesses, the tabs being slidably receivable in the recesses; and wherein rotation of the water distribution plate is slowed during intervals when either of the cam lobes engages and pushes past a respective one of the stop disk lobes, the cam lobe exerting both rotation and translation forces on the stop disk, such that one of the tabs is engaged in one of the recesses, thereby causing rotation of the stop disk and the rotor ring, such that a rotational position where the cam lobes engage the stop disk lobes continually changes as the water distribution plate rotates.

In another aspect, the invention relates to a method of controlling rotation of a water distribution plate supported on a shaft and adapted to rotate about an axis defined by the shaft by reason of impingement of a stream emitted from a nozzle on grooves formed in the plate, the method comprising: (a) slowing the rotation of the water distribution plate intermittently so as to create intervals of relatively slow and relatively fast rotation and thereby correspondingly increase and decrease, respectively, a radius of throw of the stream; and (b) continually changing circumferential locations of the intervals about the axis.

Exemplary embodiments will now be described in detail in connection with the drawings identified below.

DETAILED DESCRIPTION OF THE DRAWINGS

Figure 1:
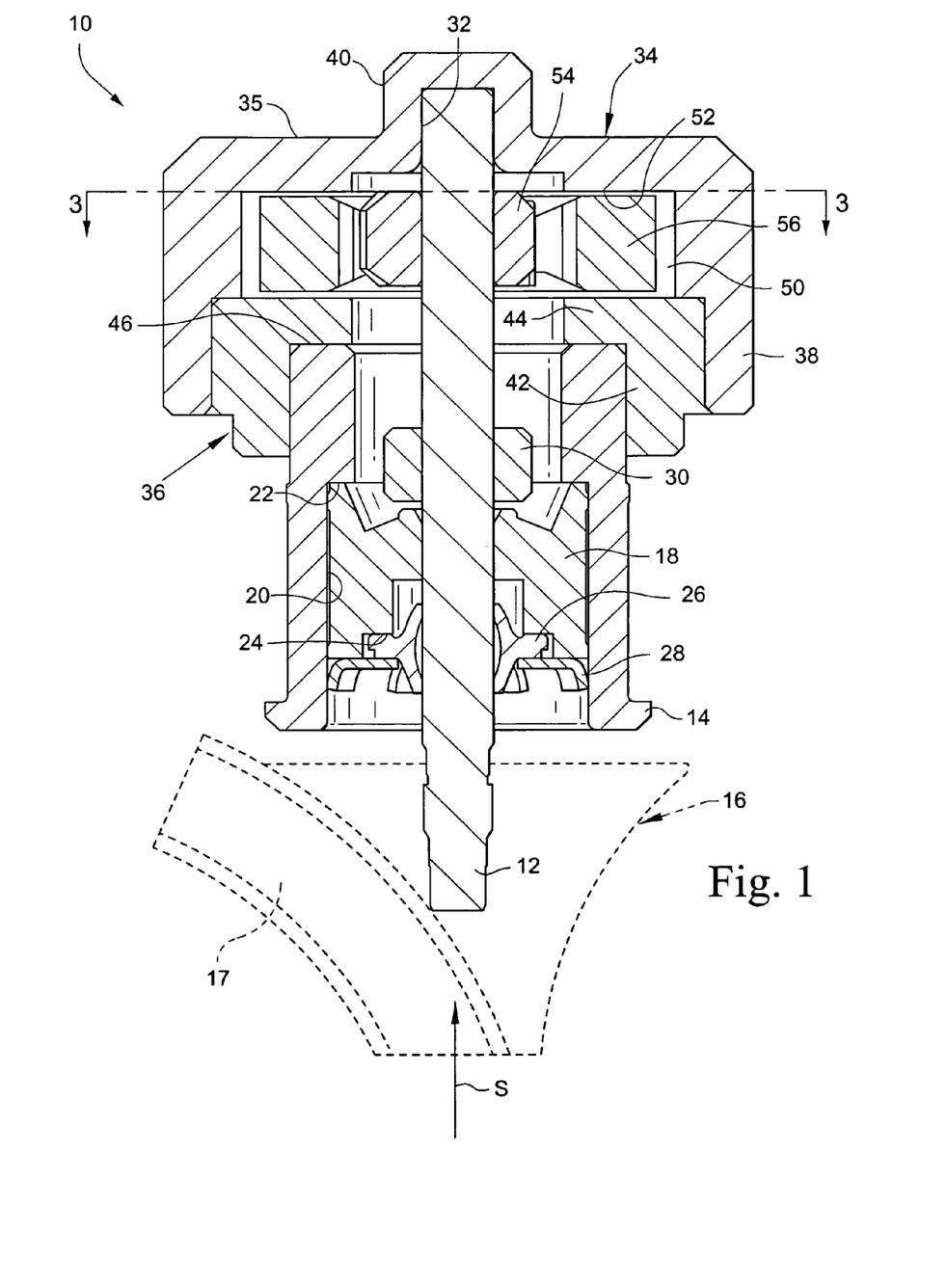
FIG. 1 is a cross section through a viscous hesitater device in accordance with an exemplary embodiment of the invention.
Figure 2:
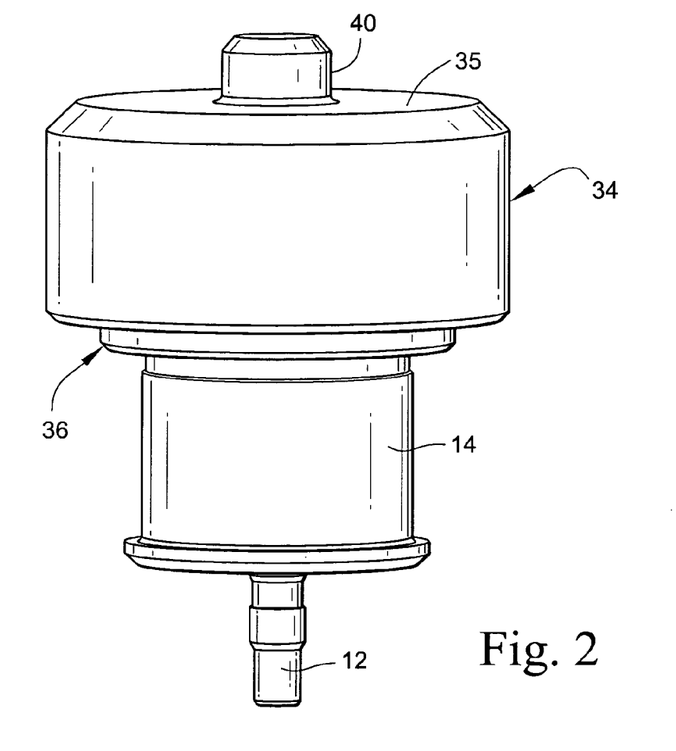
FIG. 2 is a perspective view of the device illustrated in FIG. 1.
Figure 3:
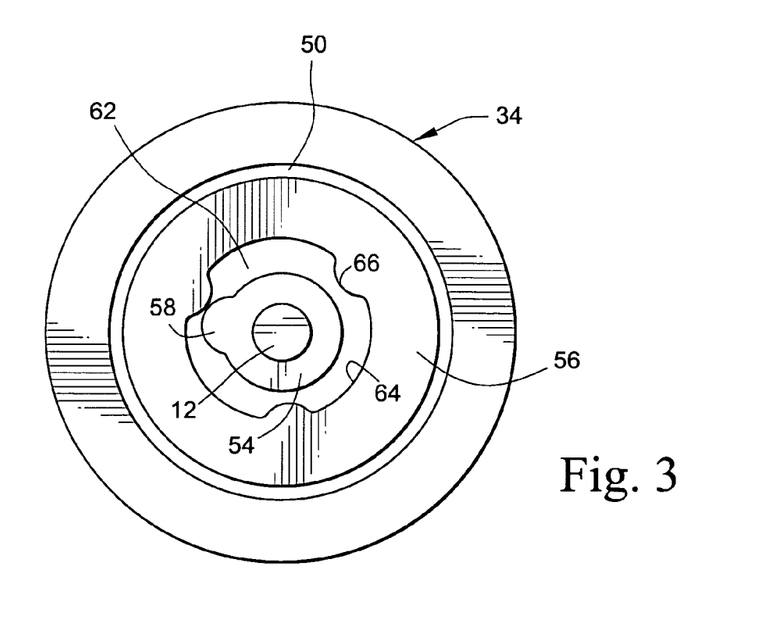
FIG. 3 is a section taken along the line 3-3 of FIG. 1, with some parts removed for the sake of clarity.

Referring initially to FIGS. 1-3, a hesitater assembly 10 for incorporation into a rotatable sprinkler includes a shaft 12 secured in a housing 14. The free end of the shaft typically mounts a conventional water distribution plate 16 that substantially radially redirects a vertical stream (indicated by arrow S in FIG. 1) emitted from a nozzle (not shown) in the sprinkler body (also not shown). The plate 16 is formed with one or more grooves 17 that are slightly curved in a circumferential direction so that when a stream emitted from the nozzle impinges on the plate 16, the nozzle stream is redirected substantially radially outwardly into one or more secondary streams that flow along the groove or grooves 17 thereby causing the plate 16 and shaft 12 to rotate.

Shaft 12 is supported within the housing 14 by a bearing 18 that is press-fit within a counterbore 20 formed in the housing. The bearing 18 engages a shoulder 22 formed in the housing and the bearing itself is formed at one end with an annular shoulder 24 that provides a seat for a conventional flexible double-lip seal 26 that engages the shaft and is held in place by a circular retainer 28. A shaft retainer 30 is mounted on the shaft adjacent the opposite end of the bearing 18.

The downstream or remote end of the shaft is received in a blind recess 32 formed in a lid 34 that is attached to a base 36 that, in turn, is attached to the downstream end of the housing 14. The lid 34 is formed with a skirt portion 38 that telescopes over and engages the peripheral side wall of the base 36, and a top surface 35 that joins to a center hub 40 defining the blind recess 32. Similarly, the base 36 is formed with a depending skirt 42 that telescopes over and engages the upper or downstream end (i.e., the end remote from the nozzle) of the housing 14. A radial flange 44 engages the upper peripheral edge 46 of the housing.

Within the lid 34, and specifically within a cavity 50 axially between the flange 44 of the base 36 and an underside surface 52 of the top surface 35, a shaft cam 54 is fixed to the shaft 12 for rotation therewith. A substantially ring-shaped rotor 56 surrounds the cam and is otherwise unattached. More specifically, the housing 14, base 36 and lid 34 are configured to form the cavity or chamber 50 between the bearing 18 and the lid 34. The chamber is at least partially if not completely filled with viscous fluid (e.g., silicone). Since the outer diameter (OD) of the ring-shaped rotor 56 is greater than the inner diameter (ID) of the base 36, the rotor is confined to chamber 50, but is otherwise free to float on or move rotationally or laterally within the fluid in the chamber.

It should be noted here that placement of the shaft cam 54 and lobe 58 (described further below) in the chamber or cavity 50 filled or at least partially filled with viscous fluid will slow the rotation of the shaft and water distribution plate under all conditions, so as to achieve a greater radius of throw as compared to a freely spinning water distribution plate. Accordingly, reference herein to fast and slow-rotation intervals are relative, recognizing that both intervals are at speeds less than would be achieved by a freely spinning water distribution plate. Thus, reference to a slow-speed (or similar) interval will be understood as referring to an even slower speed than that caused by the constantly active viscous braking effect. Similarly, any reference to "fast" rotation simply means faster than the slower speed caused by the hesitation effect.

The shaft cam 54, as best seen in FIG. 3, is formed with a smoothly curved, convex primary cam lobe 58 (the shaft lobe) projecting radially away from the cam and the shaft center.

The center opening 62 of the ring-shaped rotor 56 is defined by an inner diameter surface or edge 64 and is formed with three radially inwardly extending rotor ring or hesitator lobes 66, equally or randomly spaced about the opening 62.

The interaction between the shaft lobe 58 and the hesitater lobes 66 determines the rotational speed of the shaft 12 and hence the water distribution plate 16 (FIG. 1).

More specifically, when a prescribed amount of rotation force is applied to the shaft 12 (via the stream S impinging on grooves 17), the shaft cam 54 will rotate with the shaft within the fluid-filled cavity or chamber 50. The shaft cam 54 has little mass and large clearances which generate a lesser amount of resistance. As the shaft cam 54 rotates, the shaft lobe 58 will come into contact with one of the hesitater lobes 66 on the ring-shaped rotor 56. When this takes place, the ring-shaped rotor 56 (having a much larger mass and much tighter clearances) will immediately reduce the revolutions per minute of the cam 54 (and hence the shaft 12 and water distribution plate 16) causing a stalling or hesitating effect. The shaft lobe 58 now has to push the hesitater lobe 66 out of the way in order to resume its previous speed.

The ring-shaped rotor 56, having multiple hesitater lobes 66 is designed such that, as the shaft lobe 58 pushes past one hesitater lobe 66, it pulls the next adjacent hesitater lobe into its path. Moreover, the ring-shaped rotor 56 not only moves laterally when engaged by the shaft lobe 58, but also rotates slightly in the same direction of rotation as shaft cam 54 and shaft 12. Not being fixed, the ring-shaped rotor 56 will thus provide a random stalling or hesitating action due to the periodic but random hesitation of the water distribution plate 16. Stated otherwise, the water distribution plate 16 will rotate through repeating fast and slow angles but at random locations. Varying the outside diameter, overall thickness, the number and engagement heights of the lobes 66 on the ring-shaped rotor 56 will adjust the frequency and length of the stall events. Changing the viscosity of the fluid will also impact the above parameters.

Alternatively, if a random hesitating action is not desired, the locations at which the transition from slow-to-fast, or fast-to-slow-speed can be restricted to a number of desired repeatable positions. This is done by restraining movement of the ring-shaped rotor 56 so it can move laterally but cannot rotate when the shaft lobe 58 comes into contact with one of the slow-speed or hesitator lobes 66. The ring-shaped rotor 56 may thus be of a one or multiple-piece design, restrained in a fashion so when the shaft cam 54 rotates and shaft lobe 58 comes into contact with a hesitator lobe, the shaft lobe 58 can slowly push the hesitator lobe laterally out of its path, in a slow-speed or stall mode. When it pushes past, the shaft cam 54 (and shaft 12 and water distribution plate 16) returns to a fast-speed mode. This arrangement creates a repeatable (i.e., not a random) slow-to-fast/fast-to-slow-speed interval pattern. By increasing or decreasing the lobe clearances within the fluid-filled housing, or by altering the amount of engagement between the shaft lobe and the hesitator lobe, or both, will result in different repeatable patterns that can be customized for varying applications. Changes in those areas will directly affect the start and end positions of the slow-to-fast/fast-to-slow rotation modes as well as the rotation speed while in the slow-speed mode.

Figure 4:
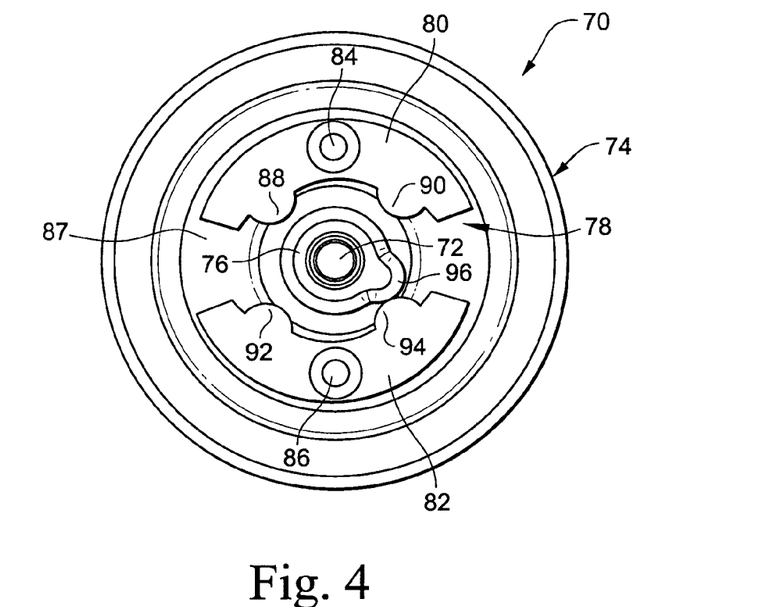
FIG. 4 is a section taken along a section line similar to line 3-3 of FIG. 1, but illustrating an alternative embodiment of the invention.
Figure 5:
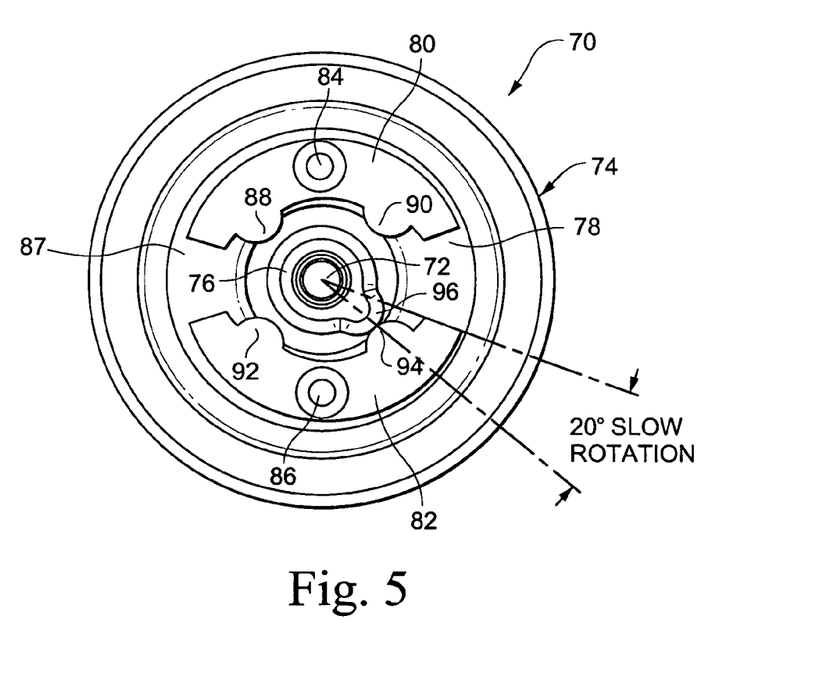
FIG. 5 is a view similar to FIG. 4 but illustrating the rotor cam rotated in a clockwise direction approximately 20°.
Figure 6:
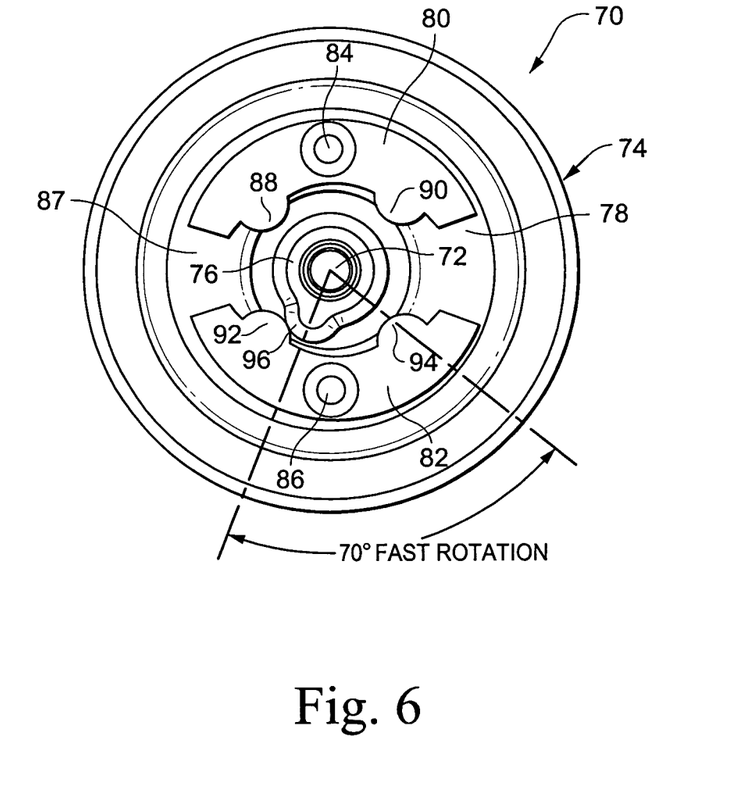
FIG. 6 is a view similar to FIGS. 4 and 5 but illustrating the rotor cam rotated approximately 70° beyond the position shown in FIG. 5.

FIGS. 4-6 illustrate an exemplary fixed-pattern hesitator arrangement. In these views, component parts are generally similar to FIGS. 1 and 2, but with a modified rotor ring. Thus, the hesitator mechanism or assembly 70 includes a shaft 72 supporting a water distribution plate (not shown but similar to 16 in FIG. 1) at one end thereof, with the opposite end mounted in a housing 74 in a manner similar to that described above. The shaft cam 76 fixed to the shaft 72 is generally similar to cam 54 and is also located in a sealed viscous fluid-filled chamber 78. In this embodiment, however, the rotor ring is formed as two arcuate segments 80, 82, pivotally mounted by pins 84, 86, respectively, to the base 87. Thus, the segments 80, 82 are limited to pivoting motion only within the chamber as described in greater detail below. The arcuate segment 80 includes a pair of radially inwardly projecting hesitator lobes 88, 90 while segment 82 includes a pair of substantially identical inwardly projecting hesitator lobes 92, 94. Note that the lobes 88, 90, 92 and 94 are circumferentially spaced substantially 90° from each other about the shaft 72. The shaft cam 76 is formed with a single radially outwardly projecting shaft lobe 96 that is located so as to successively engage the hesitater lobes 88, 90, 92 and 94 upon rotation of the shaft 72.

With this arrangement, rotation of the shaft 72 and hence the water distribution plate will slow upon engagement of the shaft lobe 96 of cam 76 with anyone of the hesitater lobes 88, 90, 92 and 94. In FIG. 4, the shaft lobe 96 has engaged the hesitater lobe 94, slowing rotation of the shaft 72 and water distribution plate. The slow-rotation interval thus starts when the shaft lobe 96 first comes into contact with the hesitater lobe 94, and will continue until the shaft lobe 96 pushes the hesitater lobe 94 out of its path sufficiently to enable the shaft lobe 96 to pass via pivoting action of the segment 82 about pin 86 in a clockwise direction. As indicated in FIG. 5, the slow-speed interval extends through an angle of approximately 20°. In other words, rotation speed will increase as the apex of the shaft lobe 96 passes the apex of hesitater lobe 94 as shown in FIG. 4.

With reference now to FIG. 5, as the shaft lobe 96 pushes past hesitater lobe 94, the pivoting movement of the arcuate segment 82 forces the other hesitater lobe 92 to be positioned in the path of the rotating shaft lobe 96. The degree of rotation from when the shaft lobe 96 pushes past the hesitater lobe 94 to when it comes into contact with the next hesitater lobe 92 may be regarded as the fast-speed interval which, as indicated in FIG. 6, extends through an angle of approximately 70°.

Figure 7:
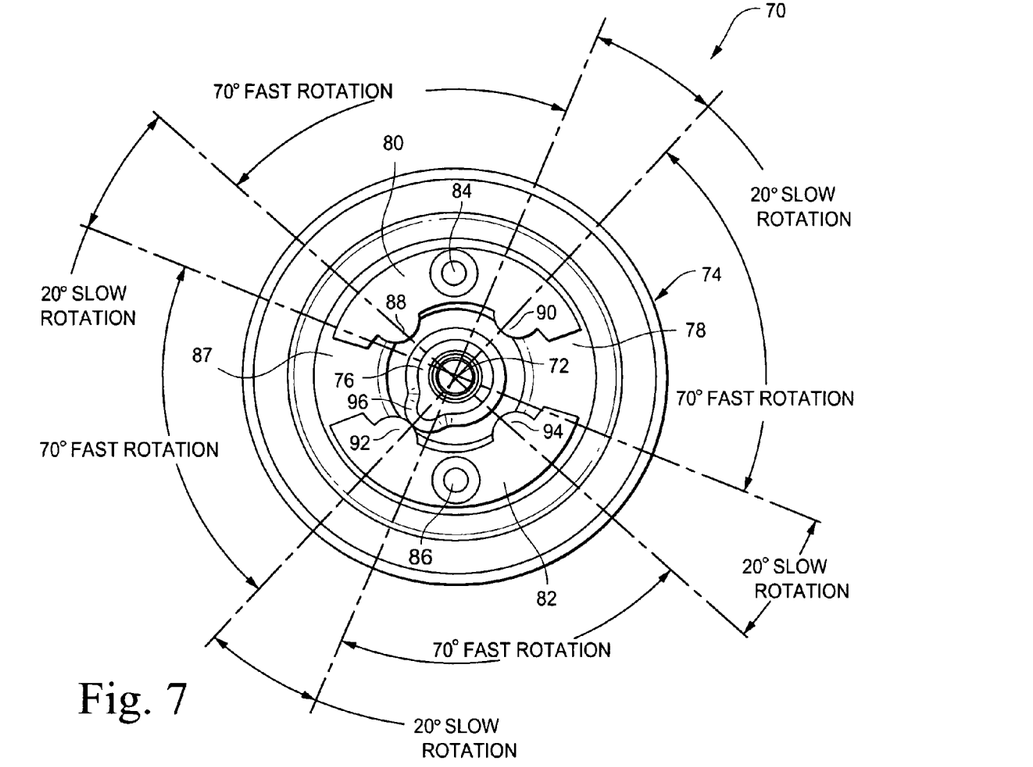
FIG. 7 is a view similar to FIG. 6 but illustrating the rotor rotated 20° past the position shown in FIG. 6, and also, illustrating the various fast and slow rotation intervals spaced about the circumference of the hesitater device.

FIG. 7 shows the shaft lobe 96 further engaged with hesitater lobe 92, and also indicates all of the fixed 20° slow-speed intervals caused by the four hesitater lobes 88, 90, 92 and 94, with 70° fast-speed intervals in between.

Figure 8:
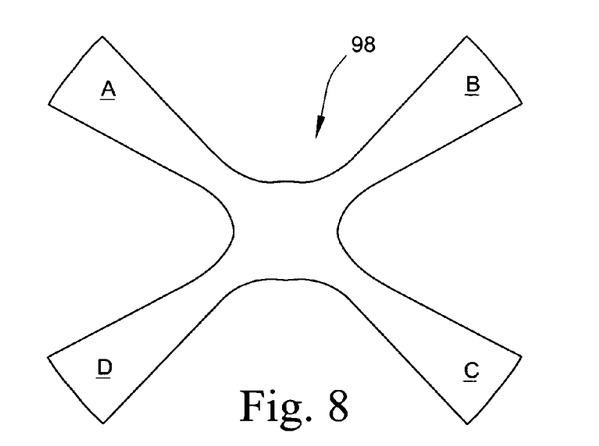
FIG. 8 illustrates a sprinkling pattern achieved by the hesitater device illustrated in FIGS. 4-7.

When the water distribution plate of the sprinkler is in the 20° slow-speed interval, it will throw the water as far as possible. (This is its "maximum throw radius.") When it rotates into the 70° fast-speed interval, the throw radius will be greatly reduced. With the described configuration of four hesitater lobes 88, 90, 92 and 94, a four-legged water pattern 98 will form as shown in FIG. 8 as the water distribution plate rotates from fast-to-slow at the four fixed hesitater lobes. The pattern 98 thus includes four extended wetted areas or legs A, B, C and D that correspond to the four 20° slow-speed intervals, whereas areas between the areas A, B, C and D correspond to the four 70° fast-speed intervals. The orientation of all four legs can be adjusted by rotating the sprinkler on its mounting riser. The total degrees of slow and/or fast rotation can also be altered by increasing or decreasing the amount (i.e., duration) of cam/lobe engagement. In addition, the slow-rotation speed and the total slow-speed time can be varied by increasing or decreasing the clearances between the moving parts.

Figure 9:
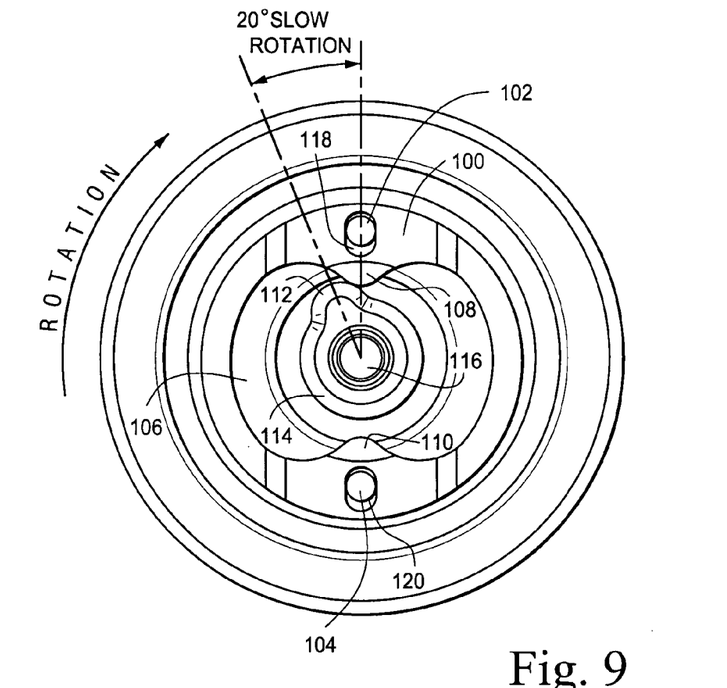
FIG. 9 is a view similar to FIG. 3 but illustrating still another embodiment of the hesitator device.

FIG. 9 discloses another embodiment where, again, the overall configuration of the subassembly is similar to that described in connection with FIGS. 1 and 2, but with a modified rotor ring. In this embodiment, the rotor ring 100 is formed as a 360° annular ring similar to ring-shaped rotor 56 shown in FIG. 1, but is confined to lateral movement only by the pins 102, 104 fixed to the base 106. The inner surface of the rotor ring 100 is formed in the shape generally of a figure-eight with a pair of radially inwardly projecting hesitater lobes 108 and 110, moveable into the path of the shaft lobe 112 of the cam 114 fixed to shaft 116. In this case, the slow-speed or slow-rotation interval starts when the shaft lobe 112 first comes into contact with a hesitator lobe, e.g., lobe 108 and the slow rotation will continue until the shaft lobe 112 pushes the hesitator lobe 108 out of its path sufficiently to enable the shaft lobe to pass by. The slow-speed interval depicted in FIG. 9 extends about 20°. Note that as the shaft lobe 112 pushes past the hesitator lobe 108, the rotor ring 100 is forced to move laterally, without rotation, by reason of pins 102, 104 being seated in aligned longitudinal slots 118, 120 formed in the rotor ring 100.

Figure 10:
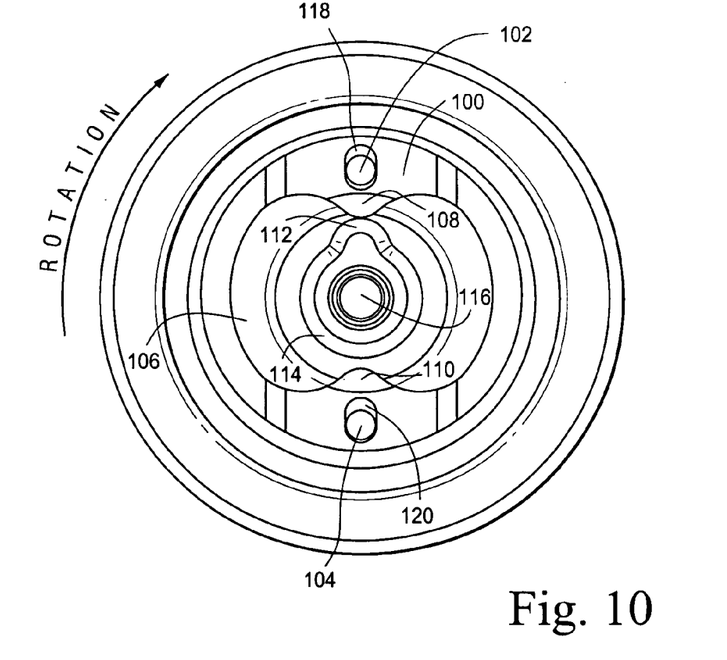
FIG. 10 is a view similar to FIG. 9 but with the rotor rotated approximately 20° from the position shown in FIG. 9.
Figure 11:
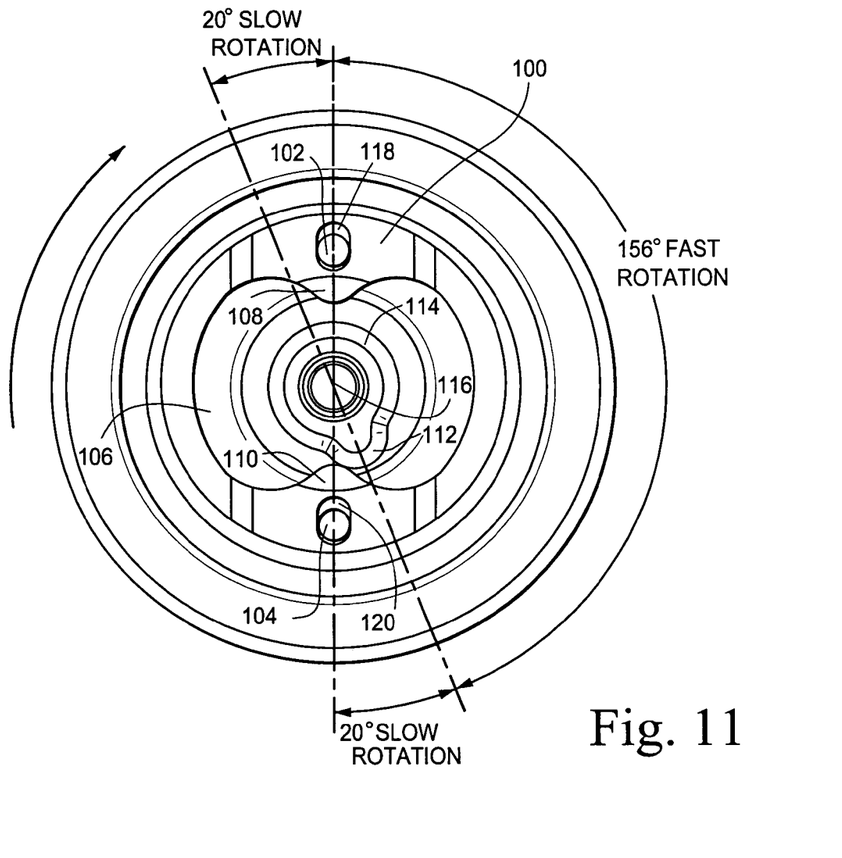
FIG. 11 is a view similar to FIG. 10 but with the rotor rotated approximately 156° from the position illustrated in FIG. 10.

Once the shaft lobe 112 has pushed the hesitater lobe 108 out of its path with the same rotational load applied to the shaft, rotation speed will increase until shaft lobe 112 engages the other hesitator lobe 110 which has been drawn into its path by the lateral movement of the rotor ring. FIG. 10 illustrates the rotor ring 100 moved laterally substantially to its maximum as the shaft lobe 112 and shaft 116 resume a normal fast-speed. FIG. 11 illustrates commencement of the next slow-speed interval of 20° following the fast-speed interval of 156°.

Figure 12:
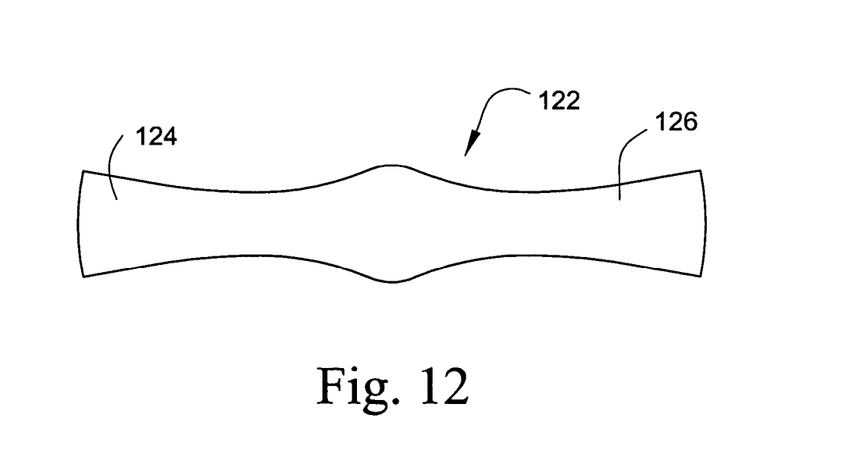
FIG. 12 illustrates a plan view of a sprinkler pattern achieved by use of the hesitater mechanism shown in FIGS. 9-11.

As may be appreciated from FIGS. 9-11, the fixed intervals of 20° slow rotation are diametrically opposed to each other. The sprinkler water distribution plate 16, while in the slow-rotation mode, will throw the water as far as possible. The water distribution plate 16 will rotate relatively fast through the 156° angles between the 20° slow-speed intervals, causing the water to be pulled back significantly. This configuration will thus form a long narrow or linear water pattern 122 as shown in FIG. 12, referred to as a strip pattern, with maximum throw evident in the pattern legs 124, 126 corresponding to the opposed 20° slow-speed intervals explained above. The orientation of the pattern is adjustable by rotating the sprinkler on its mounting riser. In addition, the 20° slow-speed angle can again be altered by increasing or decreasing the amount of cam/stop lobe engagement while the slow-rotation speed and total slow-speed time can be varied by increasing or decreasing clearances between the mating parts within the viscous-fluid chamber.

With reference now to FIGS. 13 through 18, still another embodiment is illustrated where the hesitation position is randomly altered during rotation of the shaft. More specifically, the sprinkler hesitator assembly 128 includes a sprinkler body 130 having exterior and interior, radially spaced walls 132, 134. The center shaft 136 to which the water deflection plate is mounted, is formed with (or fitted with) a cam disk 138 having a plurality of circumferentially spaced cam or shaft lobes generally indicated by reference numeral 140. Surrounding the shaft and cam disk, there is a free-floating stop disk 144 formed with a plurality of diametrically opposed stop disk tabs 148, 149. These tabs project radially outwardly and are adapted to slide within a pair of diametrically opposed recesses 150, 151, respectively, formed in a random position rotor ring 142 which is freely rotatable within the viscous chamber 152, as is the stop disk 144.

The cam disk 138, and specifically the cam or shaft lobes 140, are assembled within the housing so as to interfere with, or engage the stop disk 144. More specifically, when a clockwise rotational force is applied to the shaft 136 (by reason of the nozzle stream impinging on the rotatable water deflection plate), the shaft 136 and the cam disk 138 will rotate freely at a relatively fast rate of speed within the viscous fluid-filled housing or chamber 152. As shaft rotation continues, a lobe 140 on the cam disk 138 will come into contact with a stop disk lobe 146, causing interference and drastically slowing the shaft and cam rotation speed, even though the rotational force applied to the shaft remains constant. With the rotational force continually being applied, the cam lobe 140 will push the stop disk lobe 146 (and hence the stop disk) laterally such that tab 148 will slide radially outwardly within the recess 150 (FIG. 13). This lateral movement continues until the cam lobe 140 can pass by the stop disk lobe 146. As this is taking place, the opposite lobe 147 on the stop disk 144 will be pulled radially inwardly, positioning it to interfere with the next approaching lobe 140A on the cam disk 138. This is best seen in FIG. 13 where the stop disk lobe 147 is now directly in the path of the approaching cam lobe 140A.

During the hesitation events, the tabs 148, 149 on the stop disk will slide within the diametrically-opposed slots or recesses 150, 151 in the rotor ring 142, such that the random position rotor 142 confines the action of the stop disk 144 to a back and forth action only, relative to the rotor ring. As the lobe 140 on the cam disk 138 is pushing on lobe 146, causing tab 148 to slide within recess 150, however, some of the rotational force generated by the shaft 136 is transferred to the rotor ring 142, causing it to rotate within the housing (in a clockwise direction in FIG. 13). This action is better understood by comparing FIG. 13 to FIGS. 14-18. The total amount of rotation each time a cam lobe pushes a stop disk tab out of the way is dependent on several factors and can vary considerably. With other factors held constant, the total rotation will be most affected by the clearance gap filled by the viscous fluid between the housing and the outer diameter of the random position rotor ring 142. This fluid-filled gap creates the resistance that controls the speed at which the random position rotor ring will rotate. The geometry of the cam disk 138, the cam lobes 140, the stop disk lobes 146, 147 and the stop disk tabs 148, 149 can greatly reduce or increase the amount of rotational force transferred to the random position rotor ring 142 in addition to the viscosity of the silicon fluid used.

Figure 14:
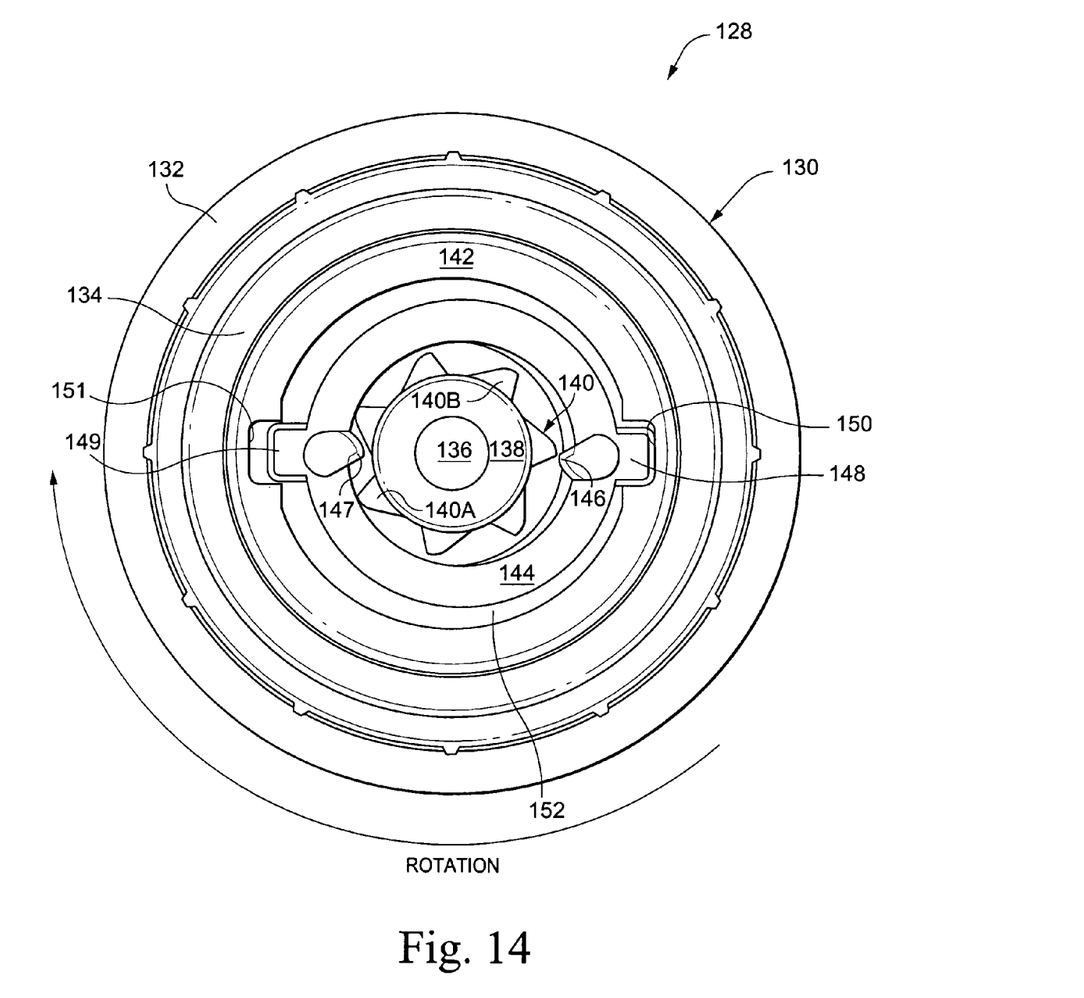
FIGS. 14-18 are views similar to that shown in FIG. 13, but illustrating progressive stages of rotation of the sprinkler shaft.
Figure 15:
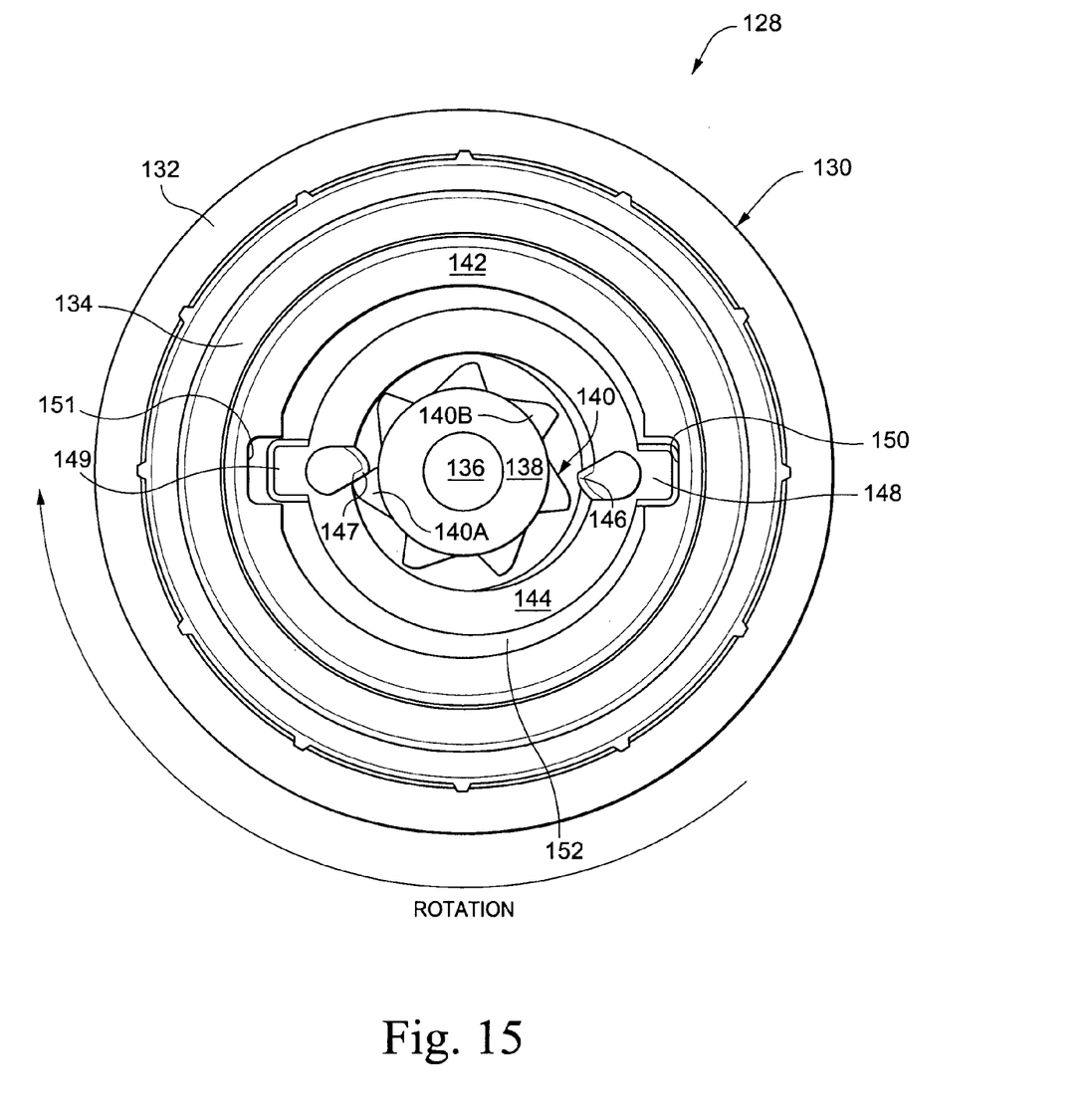
Figure 16:
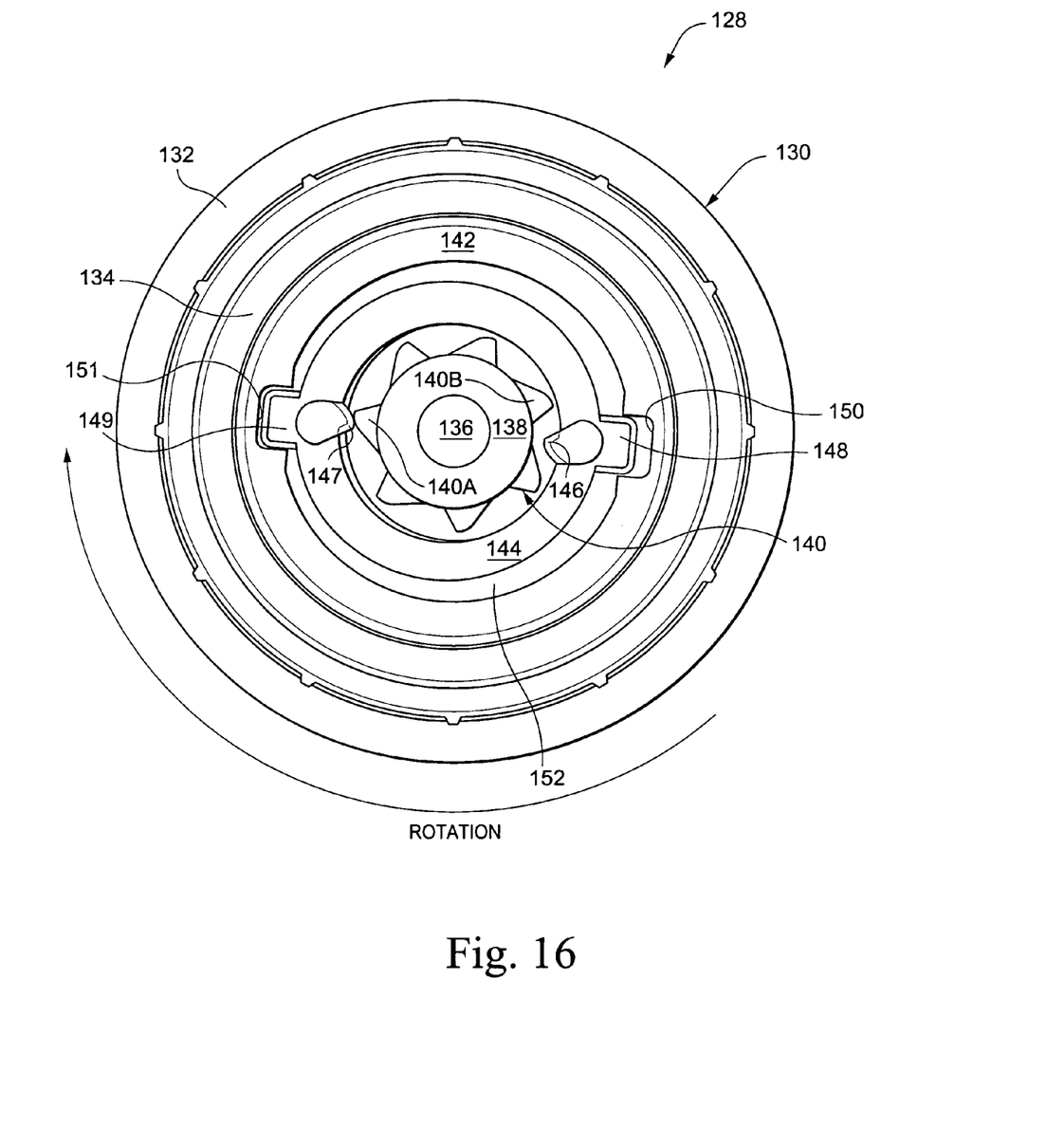

In FIG. 14, the lateral shift of the stop disk 144 has reached its limit as tab 148 is now fully engaged within the recess 150. In FIG. 15, it can be seen that as rotation of the shaft 136 continues, the cam lobe 140A engages the stop disk lobe 147 and, as it pushes the stop disk lobe 147 out of the way, the stop disk tab 149 will move radially outwardly within the recess 151, thereby pulling the stop disk lobe 146 into the path of the next approaching cam lobe 140B. At the same time, the cam lobe 140A has imparted an additional degree of rotation to the random position rotor ring 142 via rotation force exerted on the stop disk. As the cam lobe 140A passes over the stop disk lobe 147, the lateral motion of the stop disk tab 149 reaches its limit as shown in FIG. 16, with some further additional rotation imparted to the random position rotor ring 142.

Figure 17:
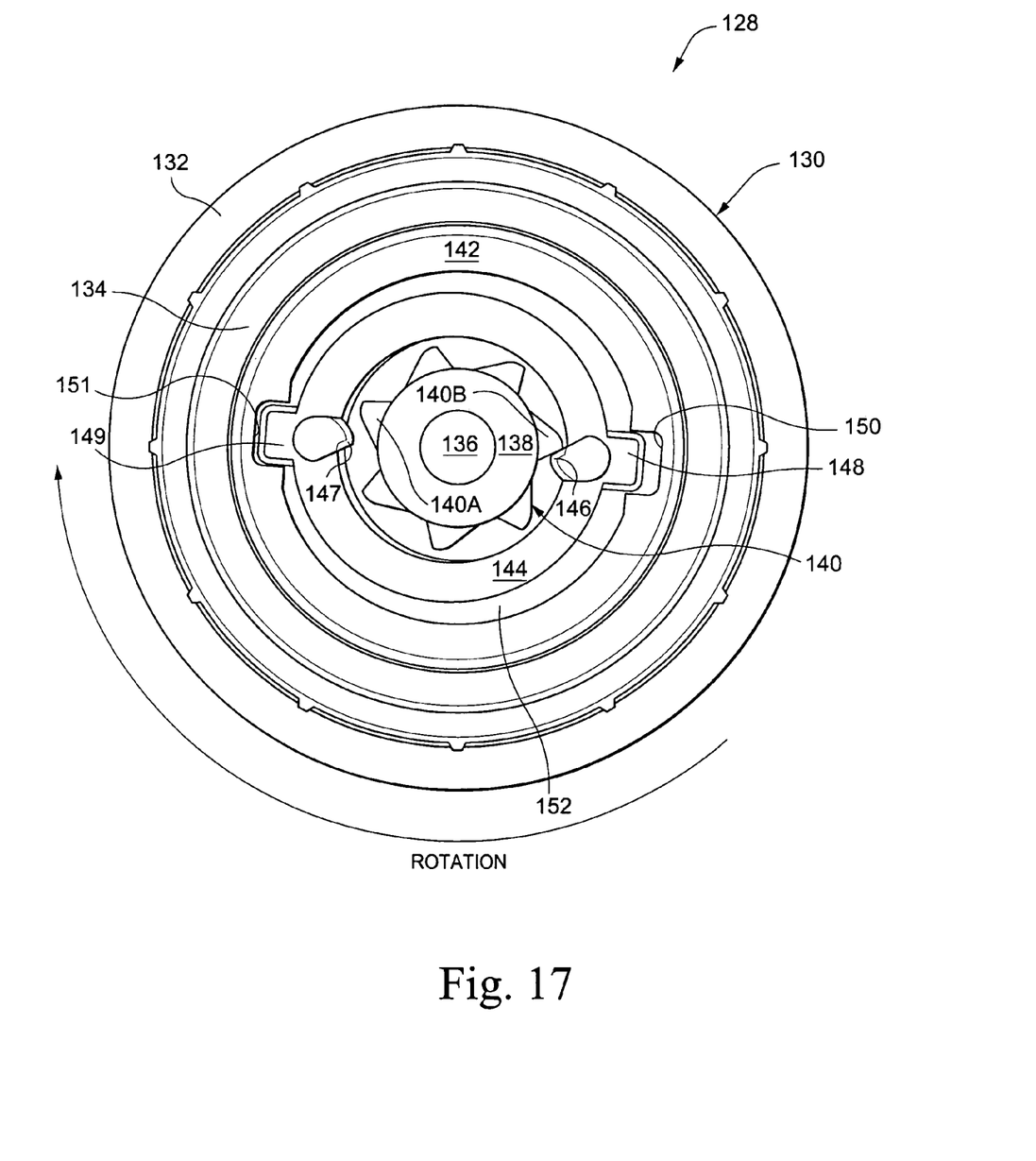
Figure 18:
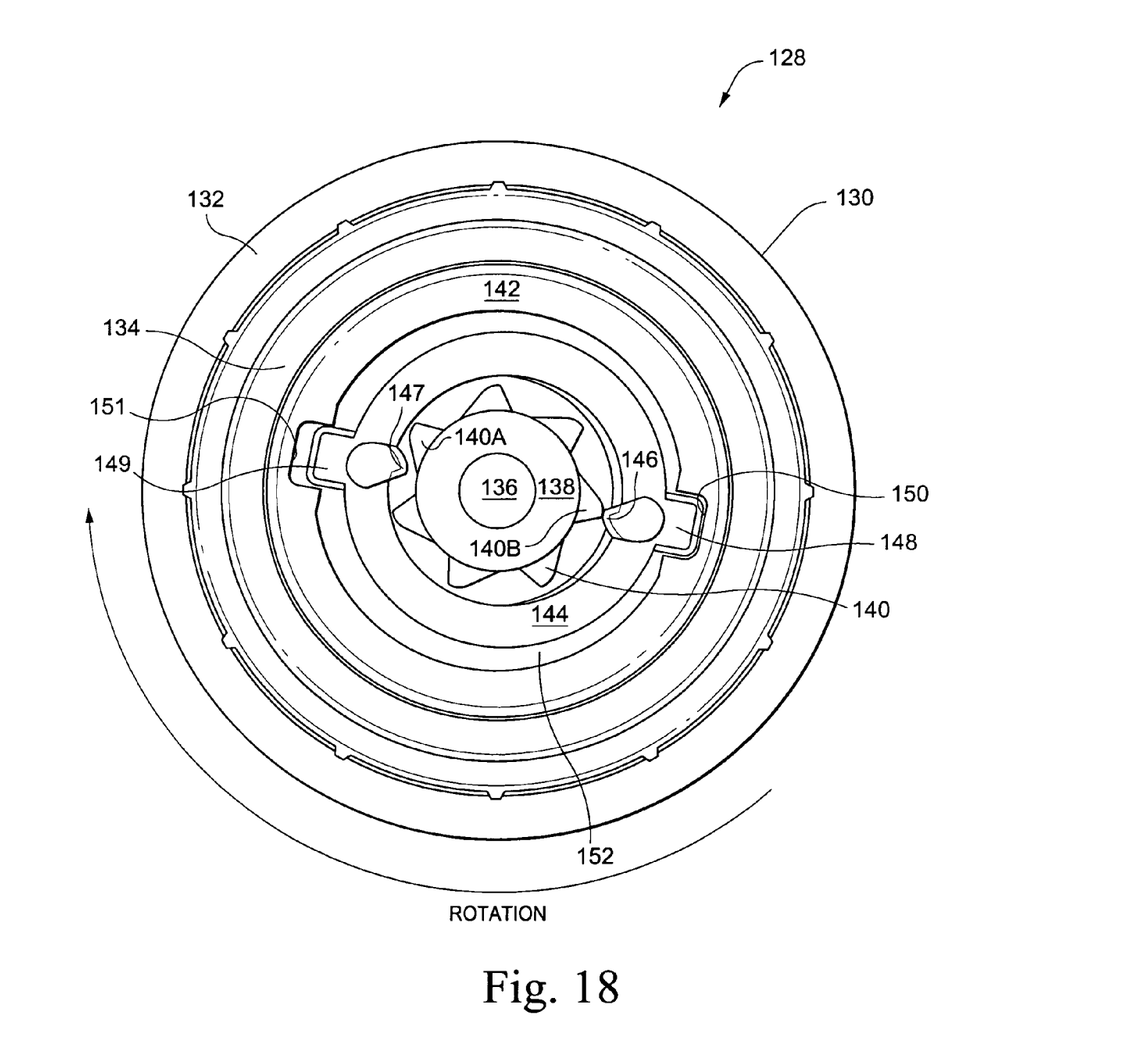

In FIG. 17, the cam lobe 140B has engaged the stop disk lobe 146, pushing the stop disk tab 148 laterally (radially outwardly) outwardly within the slot 150. FIG. 18 illustrates additional rotation of the stop disk 144 and the random position rotor ring 142 as the cam lobe 140B pushes past the stop disk lobe 146. The above-described action continues as the sprinkler shaft rotates, but the hesitation or stall interval which occurs when the cam lobes strike the stop disk tabs varies with each cycle of rotation of the shaft.

In an alternative to the arrangement shown in FIG. 13, the stop disk 144 could be pivotally attached to the rotor ring 142 by means of a pin 153 and tab or yoke 154 (shown in phantom), thereby eliminating the need for tabs 148, 149 and recesses 150, 151. With this arrangement, the stall events would occur at the same circumferential location.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling rotation of a water distribution plate supported on a shaft while the water distribution plate rotates about an axis defined by the shaft by reason of impingement of a stream emitted from a nozzle on grooves formed in said water distribution plate, the method comprising:

(a) automatically and continuously slowing rotation of said water distribution plate and said shaft intermittently so as to create respective intervals of relatively slower and relatively faster rotation through repeating angles; and (b) automatically and continuously changing circumferential locations of where respective intervals occur about said axis.

2. The method of claim 1 wherein step (a) is carried out by slowing rotation of said water distribution plate under all conditions to achieve said intervals of relatively faster rotation, and further slowing rotation to create said intervals of relatively slower rotation.

3. The method of claim 2 wherein slowing rotation under all conditions is carried out using a viscous fluid.

4. The method of claim 3 including varying the viscosity of said fluid to alter rotational speed characteristics of the water distribution plate.

5. The method of claim 1 wherein said intervals of relatively slower rotation extend through repeating angles of substantially 20°.

6. The method of claim 5 wherein said intervals of relatively faster rotation extend through repeating angles of substantially 70°.

7. The method of claim 1 wherein said intervals of relatively slower rotation comprise two, diametrically-opposed intervals of substantially 20°.

8. The method of claim 7 wherein said intervals of relatively faster rotation comprise two, diametrically-opposed intervals of substantially 156°.

* * * * *